(12) United States Patent
Lee et al.

(10) Patent No.: US 12,266,476 B2
(45) Date of Patent: Apr. 1, 2025

(54) MULTILAYER CERAMIC ELECTRONIC COMPONENT

(71) Applicant: SAMSUNG ELECTRO-MECHANICS CO., LTD., Suwon-si (KR)

(72) Inventors: Kyo Yeol Lee, Suwon-si (KR); Seung Hun Han, Suwon-si (KR); Sang Wook Lee, Suwon-si (KR); Jung Min Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 632 days.

(21) Appl. No.: 17/412,731

(22) Filed: Aug. 26, 2021

(65) Prior Publication Data

US 2022/0208457 A1 Jun. 30, 2022

(30) Foreign Application Priority Data

Dec. 31, 2020 (KR) ........................ 10-2020-0189101

(51) Int. Cl.
*H01G 4/224* (2006.01)
*H01G 4/232* (2006.01)
*H01G 4/248* (2006.01)
*H01G 4/30* (2006.01)

(52) U.S. Cl.
CPC ............ *H01G 4/224* (2013.01); *H01G 4/232* (2013.01); *H01G 4/248* (2013.01); *H01G 4/30* (2013.01)

(58) Field of Classification Search
CPC .......... H01G 4/30; H01G 4/232; H01G 4/224; H01G 4/248
USPC ..................... 361/301.4, 306.3, 321.1, 321.3
See application file for complete search history.

(56) References Cited

U.S. PATENT DOCUMENTS

| | | |
|---|---|---|
| 4,377,619 A | 3/1983 | Schonhorn et al. |
| 8,587,923 B2 | 11/2013 | Ogawa et al. |
| 9,881,741 B2 * | 1/2018 | Otani ................... H01G 4/2325 |
| 10,395,840 B1 | 8/2019 | Park et al. |

(Continued)

FOREIGN PATENT DOCUMENTS

| | | |
|---|---|---|
| JP | 3444291 B2 | 9/2003 |
| KR | 10-2019-0038237 A | 4/2019 |

(Continued)

*Primary Examiner* — Arun Ramaswamy
(74) *Attorney, Agent, or Firm* — Morgan, Lewis & Bockius LLP (57) ABSTRACT

A multilayer ceramic electronic component includes: a ceramic body including dielectric layers and first internal electrodes and second internal electrodes disposed to face each other and alternately stacked with the respective dielectric layers interposed therebetween; a first external electrode connected to the first internal electrodes; a second external electrode connected to the second internal electrodes; and a protective layer disposed on the ceramic body, the first external electrode, and the second external electrode, wherein the protective layer includes an adhesion assisting layer and a coating layer, an average thickness of the protective layer is 70 nm or more and/or less than 400 nm, and a ratio of an average thickness of the coating layer to the average thickness of the protective layer is 0.25 or more and/or 0.75 or less.

28 Claims, 6 Drawing Sheets

(56) References Cited

U.S. PATENT DOCUMENTS

| | | | | |
|---|---|---|---|---|
| 2010/0302704 A1* | 12/2010 | Ogawa | ............... | H01G 4/2325 |
| | | | | 361/306.3 |
| 2011/0309718 A1* | 12/2011 | Ogawa | ................. | H01G 4/232 |
| | | | | 361/321.1 |
| 2016/0268046 A1* | 9/2016 | Nishisaka | ............. | H01G 4/232 |
| 2019/0103224 A1 | 4/2019 | Han et al. | | |

FOREIGN PATENT DOCUMENTS

| | | |
|---|---|---|
| KR | 10-2019-0121219 A | 10/2019 |
| WO | 2014/027854 A1 | 2/2014 |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2020-0189101, filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

Recently, in accordance with enlargement of an application field of electronic products, a technical field in which multilayer ceramic electronic components are used has also been enlarged. In particular, in accordance with vehicle electronics (Vetronics), a structure in which an electronic control unit (ECU) or a transmission control unit (TCU) of a vehicle is disposed in an engine room or is directly attached to a transmission has been used.

However, when an existing multilayer ceramic electronic component is used in a harsh environment such as a high temperature and high vibrations, expansion and contraction due to high/low temperature cycles are repeated, resulting in continuous mechanical stress. In addition, continuous application of the mechanical stress is a main cause of cracks occurring in terminal electrodes or solders.

In addition, in a process of manufacturing multilayer ceramic electronic components, in many cases, a plating layer is formed on an external electrode after a ceramic body and the external electrode are sintered. However, at the time of manufacturing an electronic component by high-temperature heat treatment, a hydrophilic oxide layer having high surface energy is formed on a surface of the ceramic body, and a possibility that pores that become paths through which moisture may penetrate will be generated at an interface between the ceramic body and the external electrode increases.

In particular, when the multilayer ceramic electronic component is continuously exposed to a high temperature and/or high humidity environment, a possibility that ion migration will occur in the external electrode of the multilayer ceramic electronic component itself increases. The oxide layer formed on the surface of the ceramic body has high surface energy, and allows moisture to easily adhere to the surface of the ceramic body due to a high temperature, a high humidity, and its hydrophilicity at the time of applying a voltage. An ion migration phenomenon in which an electrode material migrates toward an opposite electrode through such moisture occurs, and a problem that reliability of the multilayer ceramic electronic component decreases, such as a short circuit may occur.

SUMMARY

An aspect of the present disclosure may provide a multilayer ceramic electronic component of which deterioration of characteristics due to penetration of moisture may be prevented.

Another aspect of the present disclosure may provide a multilayer ceramic electronic component in which ion migration may be suppressed.

Another aspect of the present disclosure may provide a multilayer ceramic electronic component in which a defect such as a short circuit may be reduced.

Another aspect of the present disclosure may provide a multilayer ceramic electronic component capable of having excellent reliability.

According to an aspect of the present disclosure, a multilayer ceramic electronic component may include: a ceramic body including dielectric layers and first internal electrodes and second internal electrodes disposed to face each other and alternately stacked with the respective dielectric layers interposed therebetween; a first external electrode connected to the first internal electrodes; a second external electrode connected to the second internal electrodes; and a protective layer disposed on the ceramic body, the first external electrode, and the second external electrode, wherein the protective layer includes an adhesion assisting layer and a coating layer, an average thickness of the protective layer is 70 nm or more and/or less than 400 nm, and a ratio of an average thickness of the coating layer to the average thickness of the protective layer is 0.25 or more and/or 0.75 or less.

According to another aspect of the present disclosure, a multilayer ceramic electronic component may include: a ceramic body including dielectric layers and first internal electrodes and second internal electrodes disposed to face each other and alternately stacked with the respective dielectric layers interposed therebetween; a first external electrode connected to the first internal electrodes; a second external electrode connected to the second internal electrodes; and a protective layer disposed on the ceramic body, the first external electrode, and the second external electrode, wherein the protective layer includes an adhesion assisting layer and a coating layer, an average thickness of the protective layer is 400 nm or more and/or 600 nm or less, and a ratio of an average thickness of the coating layer to the average thickness of the protective layer is 0.05 or more to 0.95 or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, an X direction refers to a first direction, an L direction, or a length direction, a Y direction refers to a second direction, a W direction, or a width direction, and a Z direction refers to a third direction, a T direction, or a thickness direction.

The present disclosure relates to a multilayer ceramic electronic component. FIGS. 1 through 5 are schematic views illustrating a multilayer ceramic electronic component according to an exemplary embodiment in the present disclosure. Hereinafter, a multilayer ceramic electronic component according to the present disclosure will be described with reference to FIGS. 1 through 5.

A multilayer ceramic electronic component 100 according to an exemplary embodiment in the present disclosure may include a ceramic body 110 including dielectric layers 111 and first internal electrodes 121 and second internal electrodes 122 disposed to face each other and alternately stacked with the respective dielectric layers 111 interposed therebetween; a first external electrode 131 connected to the first internal electrodes 121; a second external electrode 132 connected to the second internal electrodes 122; and a protective layer 140 disposed on the ceramic body 110, the first external electrode 131, and the second external electrode 132.

Figure 4:
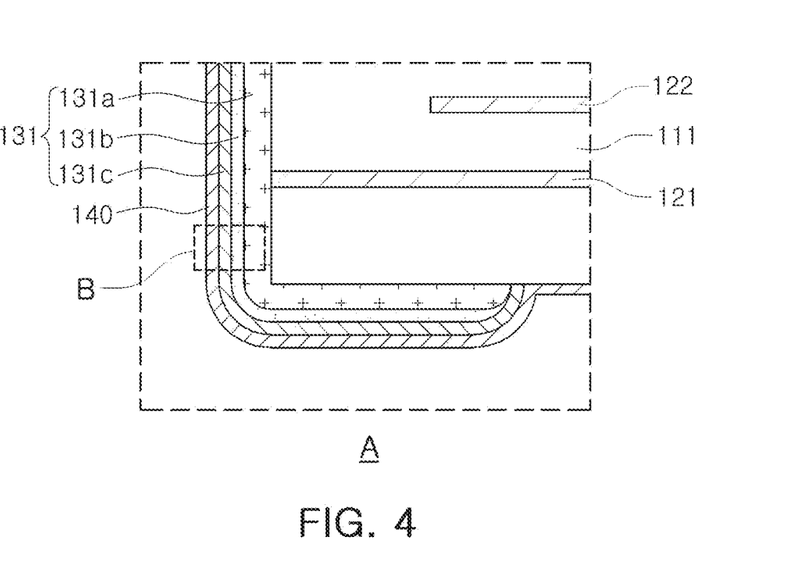
FIG. 4 is an enlarged view of region A of FIG. 3.
Figure 5:
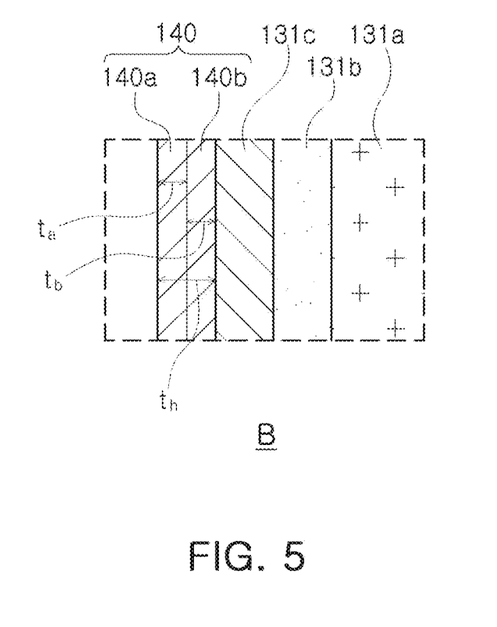
FIG. 5 is an enlarged view of region B of FIG. 4.

In this case, the protective layer 140 may include an adhesion assisting layer 140b and a coating layer 140a. In order to improve moisture resistance reliability of the multilayer ceramic electronic component, a method of forming a water repellent layer or the like on an outer surface of the multilayer ceramic electronic component may be used. However, this method generally has a limitation that a bonding force between a surface of the ceramic body and the water repellent layer is not strong, and has a problem that it is difficult to sufficiently secure reliability of a chip when the multilayer ceramic electronic component is exposed to repetitive vibrations. According to an exemplary embodiment of the present disclosure, the protective layer 140 disposed on a surface of the multilayer ceramic electronic component includes the adhesion assisting layer 140b and the coating layer 140a in order to solve the problem described above. As a result, moisture resistance reliability may be improved through moisture penetration prevention, ion migration suppression, and improvement of a bonding strength with the multilayer ceramic electronic component.

In an exemplary embodiment in the present disclosure, an average thickness of the protective layer 140 of the multilayer ceramic electronic component may be 70 nm or more and/or less than 400 nm, and a ratio ($t_a/t_h$) of the average thickness ($t_a$) of the coating layer to the average thickness ($t_h$) of the protective layer 140 may be 0.25 or more and/or 0.75 or less. In the present specification, the term "thickness" may refer to a thickness of a certain member measured in a direction perpendicular to a surface of the member, and the term "average thickness" may refer to an arithmetic average of thicknesses measured at points where a region in which the protective layer 140 is disposed is divided into ten equal parts at equal intervals with respect to a cross section of the multilayer ceramic electronic component taken along a direction perpendicular to the Z axis while passing through the center of the multilayer ceramic electronic component. The measurement of an average thickness is not limited to these examples, and one of ordinary skill may select the number of measurement points, the interval between the measurement points, and so forth, if needed. The measurement of the thickness for each measurement point may be done by using a microscopy image, for example, a scanning electron microscope (SEM) image, but is not limited thereto. The average thickness of the protective layer 140 and the average thickness of the coating layer may be values measured at the same point. When the average thickness of the protective layer 140 and the average thickness of the coating layer of the multilayer ceramic electronic component according to the present exemplary embodiment are in the ranges described above, moisture resistance may be excellent and a bonding strength of the protective layer 140 may be improved, such that moisture resistance reliability may be further improved.

In another exemplary embodiment in the present disclosure, an average thickness of the protective layer 140 of the multilayer ceramic electronic component may be 400 nm or more and/or 600 nm and less, and a ratio ($t_a/t_h$) of the average thickness ($t_a$) of the coating layer to the average thickness ($t_h$) of the protective layer 140 may be 0.05 or more to 0.95 or less. When the average thickness of the protective layer 140 and the average thickness of the coating layer of the multilayer ceramic electronic component according to the present exemplary embodiment are in the ranges described above, moisture resistance reliability may be improved, and a defect at the time of mounting the multilayer ceramic electronic component on a board may be suppressed.

Figure 1:
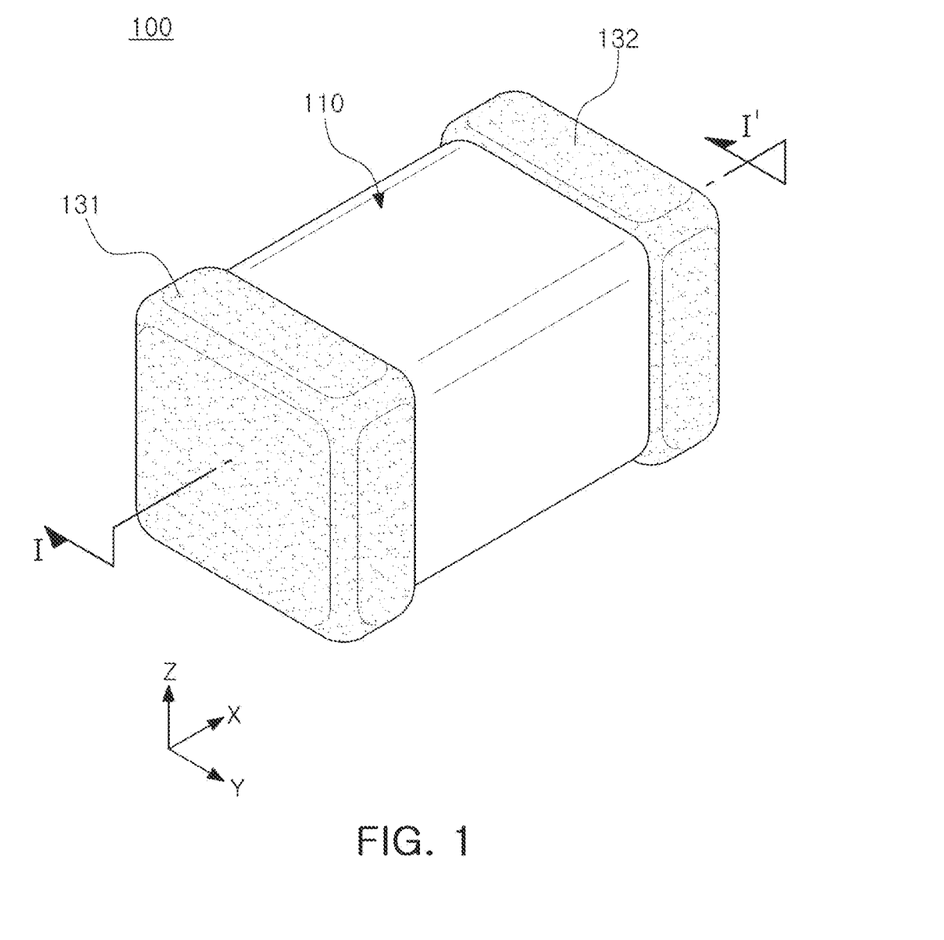
FIG. 1 is a schematic perspective view illustrating a multilayer ceramic electronic component according to an exemplary embodiment in the present disclosure.
Figure 2:
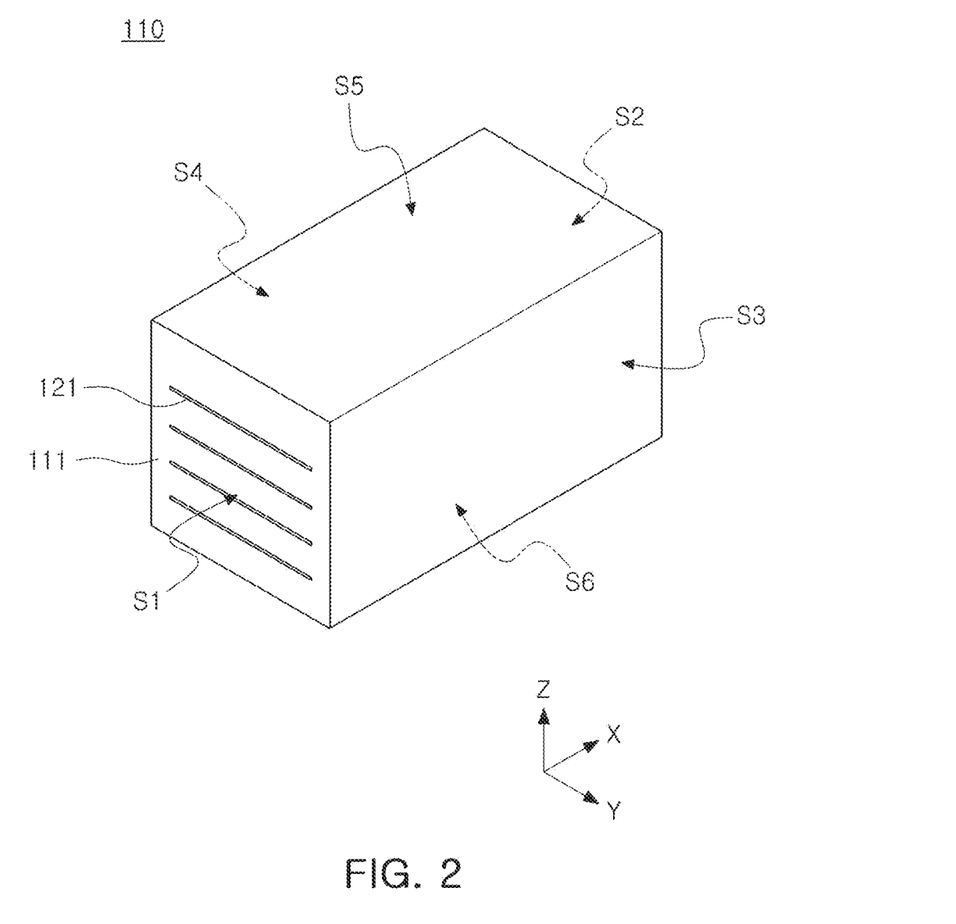
FIG. 2 is a schematic perspective view illustrating a ceramic body of FIG. 1.
Figure 3:
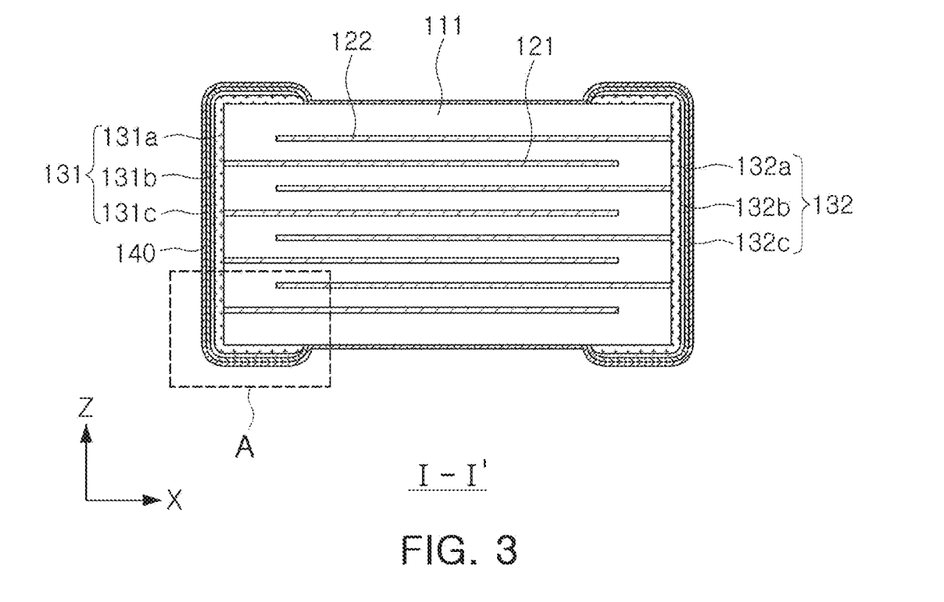
FIG. 3 is a cross-sectional view taken along line I-I' of FIG. 1.

The multilayer ceramic electronic component 100 according to an exemplary embodiment in the present disclosure may include the ceramic body 110 including the dielectric layers 111 and the first and second internal electrodes 121 and 122 alternately stacked with the respective dielectric layers 111 interposed therebetween.

The ceramic body 110 may include first and second surfaces S1 and S2 opposing each other in the first direction (the X direction), third and fourth surfaces S3 and S4 opposing each other in the second direction (the Y direction), and fifth and sixth surfaces S5 and S6 opposing each other in the third direction (the Z direction).

A specific shape of the ceramic body 110 is not particularly limited, but may be a hexahedral shape or a shape similar to the hexahedral shape, as illustrated. Although the ceramic body 110 does not have a hexahedral shape having perfectly straight lines due to shrinkage of ceramic powders included in the ceramic body 110 in a sintering process, the ceramic body 110 may have substantially the hexahedral shape. The ceramic body 110 may be subjected to round treatment so that edges thereof are not angulate, if necessary. The round treatment may be, for example, barrel polishing or the like, but is not limited thereto.

The dielectric layers 111, the first internal electrodes 121, and the second internal electrodes 122 may be alternately stacked in the ceramic body 110. The dielectric layers 111, the first internal electrodes 121, and the second internal electrodes 122 may be stacked in the third direction (the Z direction). The plurality of dielectric layers 111 may be in a sintered state, and adjacent dielectric layers 111 may be integrated with each other so that boundaries therebetween are not readily apparent without using a scanning electron microscope (SEM).

According to an exemplary embodiment in the present disclosure, the dielectric layer 111 may include a component represented by $(Ba_{1-x}Ca_x)(Ti_{1-y}(Zr,Sn,Hf)_y)O_3$ (here, $0 \leq x \leq 1$ and $0 \leq y \leq 0.5$). The component may be, for example, a compound in which Ca, Zr, Sn, and/or Hf are partially solid-dissolved in $BaTiO_3$. In the above composition formula, x may be in the range of 0 or more and 1 or less, and y may be in the range of 0 or more and 0.5 or less, but is not limited thereto. For example, when x is 0, y is 0, and z is 0 in the above composition formula, a component may be $BaTiO_3$. In addition, various ceramic additives, organic solvents, plasticizers, binders, dispersants, and the like, may be added to the component according to an object of the present disclosure.

The dielectric layers 111 may be formed by adding an additive as necessary to slurry including the material described above and applying and then drying the slurry to carrier films to prepare a plurality of ceramic sheets. The ceramic sheets may be formed by manufacturing the slurry in a sheet shape having a thickness of several micrometers by a doctor blade method, but are not limited thereto.

The ceramic body 110 may be formed by alternately stacking ceramic green sheets on which the first internal electrodes 121 are printed and ceramic green sheets on which the second internal electrodes 122 are printed, on the dielectric layers 111 in the third direction (the Z direction). A method of printing the first and second internal electrodes may be a screen printing method, a gravure printing method or the like, but is not limited thereto.

The first and second internal electrodes 121 and 122 may be stacked so that end surfaces thereof are exposed, respectively, to opposite portions of the ceramic body 110 opposing each other. Specifically, the first and second internal electrodes 121 and 122 may be exposed to opposite surfaces of the ceramic body 110 in the first direction (X direction), respectively, the first internal electrodes 121 may be exposed to a first surface S1 of the ceramic body 110, and the second internal electrodes 122 may be exposed to a second surface S2 of the ceramic body 110.

The first and second internal electrodes 121 and 122 may include a conductive metal. The conductive metal may include one or more of, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), and alloys thereof. The first and second internal electrodes 121 and 122 may be formed using a conductive paste including the conductive metal.

In the multilayer ceramic electronic component according to the present disclosure, the first external electrode 131 and the second external electrode 132 may be disposed on outer surfaces of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 120.

The first external electrode 131 may include a first electrode layer 131a, a first conductive layer 131b, and a first metal layer 131c, and the second external electrode 132 may include a second electrode layer 132a, a second conductive layer 132b, and a second metal layer 132c. The first electrode layer 131a may be connected to the first internal electrodes 121, and the second electrode layer 132a may be connected to the second internal electrodes 122. In addition, the first conductive layer 131b may be disposed on the first electrode layer 131a, and the second conductive layer 132b may be disposed on the second electrode layer 132a. The first conductive layer 131b may be disposed to cover the first electrode layer 131a, and the second conductive layer 132b may be disposed to cover the second electrode layer 132a.

In an exemplary embodiment in the present disclosure, the first electrode layer 121 and the second electrode layer 122 of the multilayer ceramic electronic component 100 may be sintered electrodes including a conductive metal. The conductive metal may include one or more of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof.

In addition, the first electrode layer 131a and the second electrode layer 132a may include glass. The glass may be a composition in which oxides are mixed with each other, and may be one or more selected from the group consisting of silicon oxide, boron oxide, aluminum oxide, transition metal oxide, alkali metal oxide, and alkaline earth metal oxide, but is not particularly limited thereto. The transition metal may be selected from the group consisting of zinc (Zn), titanium (Ti), copper (Cu), vanadium (V), manganese (Mn), iron (Fe), and nickel (Ni), an alkali metal may be selected from the group consisting of lithium (Li), sodium (Na) and potassium (K), and an alkaline earth metal may be at least one selected from the group consisting of magnesium (Mg), calcium (Ca), strontium (Sr), and barium (Ba).

The first electrode layer 131a and the second electrode layer 132a may be formed by dipping and then sintering the ceramic body in a conductive paste including a conductive metal or may be formed by printing the conductive paste on surfaces of the ceramic body by a screen printing method, a gravure printing method or the like, and then sintering the ceramic body, for example. In addition, the first electrode layer 131a and the second electrode layer 132a may be formed by applying the conductive paste to the surfaces of the ceramic body or transferring a dry film on which the conductive paste is dried onto the ceramic body and then sintering the ceramic body, but are not limited thereto. For example, the first electrode layer 131a and the second electrode layer 132a may be formed by forming the conductive paste on the ceramic body by various methods other than the methods described above, and then sintering the ceramic body.

According to an exemplary embodiment in the present disclosure, the first and second conductive layers 131b and 132b disposed on the first and second electrode layers 131a and 132a of the multilayer ceramic electronic component 100, respectively, may be plating layers. The first and second conductive layers 131b and 132b may contain nickel (Ni) most abundantly, and may include one or more selected from the group consisting of copper (Cu), tin (Sn), palladium (Pd), platinum (Pt), gold (Au), silver (Ag), tungsten (W), titanium (Ti), lead (Pb), and alloys thereof, but are not limited thereto. The plating layer may be one layer or a plurality of layers and may be formed by sputtering or electric deposition, but is not limited thereto.

In an exemplary embodiment in the present disclosure, the first and second metal layers disposed on the first and second conductive layers 131b and 132b of the multilayer ceramic electronic component 100, respectively, may be plating layers. The first metal layer 131c may be disposed to cover the first conductive layer 131b, and the second metal layer 132c may be disposed to cover the second conductive layer 132b. The first and second metal layers may contain tin (Sn) most abundantly, and may include one or more selected from the group consisting of copper (Cu), nickel (Ni), palladium (Pd), platinum (Pt), gold (Au), silver (Ag), tungsten (W), titanium (Ti), lead (Pb), and alloys thereof, but are not limited thereto.

In an exemplary embodiment, at least parts of the first external electrode 131 of the multilayer ceramic electronic component according to the present disclosure may extend to and be disposed on the third surface S3, the fourth surface S4, the fifth surface S5, and the sixth surface S6 of the ceramic body 110. In addition, at least parts of the second external electrode 132 may extend to and be disposed on the third surface S3, the fourth surface S4, the fifth surface S5, and the sixth surface S6 of the ceramic body 110. In this case, the first external electrode 131 and the second external electrode 132 may be disposed to be spaced apart from each other. When at least parts of respective first external electrode 131 and/or the second external electrode 132 extend to and are disposed on the third surface S3, the fourth surface S4, the fifth surface S5, and the sixth surface S6 of the ceramic body 110, the extending parts may function as so-called band portions, and may function to improve a mounting strength of the multilayer ceramic electronic component 100 according to the present disclosure and prevent moisture penetration into the multilayer ceramic electronic component 100.

In the multilayer ceramic electronic component according to the present disclosure, the protective layer 140 may be disposed on the ceramic body, the first external electrode 131, and the second external electrode 132 described above. The protective layer 140 may be disposed to cover at least parts of the ceramic body, the first external electrode 131, and/or the second external electrode 132. In the present specification, the meaning that a certain member is disposed to cover the ceramic body 110 is that the member is disposed so that a portion of the ceramic body 110 covered by the member is not exposed externally. In this case, the protective layer 140 may be disposed to cover substantially the entirety of the ceramic body 110, the first external electrode 131, and/or the second external electrode 132. In the present specification, the meaning that a certain member "covers substantially the entirety" of a predetermined region is that not only the member is disposed to cover the entirety of the region in a strict sense, but an error or the like in a manufacturing process is also included, and is, for example, that a ratio in a region in which the member is not disposed in an entire area of the region is 0% or more and/or 5% or less. In an exemplary embodiment, the protective layer 140 may be disposed to cover the entire surfaces of the multilayer ceramic electronic component according to the present disclosure. Therefore, moisture resistance reliability more excellent than that in a case in which a protective layer is formed only on a part of the multilayer ceramic electronic component may be obtained.

The protective layer 140 may include the adhesion assisting layer 140b and the coating layer 140a. The adhesion assisting layer 140b and the coating layer 140a may be sequentially stacked on the ceramic body, in the order of the ceramic body 110, the first external electrode 131, and the second external electrode 132. In this case, the adhesion assisting layer 140b may be disposed to be in direct contact with the ceramic body, the first external electrode 131, and the second external electrode 132, and the coating layer 140a may be disposed on the adhesion assisting layer 140b.

In one exemplary embodiment, the coating layer 140a covering the first external electrode 131 and the coating layer 140a covering the second external electrode 132 may be connected to each other.

On the other hand, the adhesion assisting layer 140b covering the first external electrode 131 and the adhesion assisting layer 140b covering the second external electrode 132 may be spaced apart from each other.

In this case, the protective layer 140 may include a crosslink linking the adhesion assisting layer and the coating layer 140a to each other. In the present specification, the term "bond" refers to a state in which surfaces of an adhesive and an adherend are bonded to each other by a bonding force of an interface. The bonding force of the interface may be due to a chemical interaction between surface molecules of the adhesive and the adherend, or may be due to mechanical bonding. In the present specification, the term "crosslink" refers to forming a network structure through chemical/physical bonds such as covalent bonds, ionic bonds, Van der Waals bonds, or hydrogen bonds between molecules. The adhesion assisting layer 140b and the coating layer 140a may be connected to each other through the crosslink to have a more excellent bonding force.

In an exemplary embodiment in the present disclosure, a component of the adhesion assisting layer 140b of the multilayer ceramic electronic component is not particularly limited as long as it exhibits an excellent adhesive force to the ceramic body 110 and/or a coating layer 140a to be described later. The adhesion assisting layer 140b may include a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer, but is not limited thereto.

In an exemplary embodiment, the polymer of the adhesion assisting layer 140b of the multilayer ceramic electronic component according to the present disclosure may include a compound including two or more vinyl groups. The compound including the two or more vinyl groups, which is to improve a mechanical/chemical strength of the protective layer 140 according to the present disclosure, may be bonded to the surface of the ceramic body 110, and may form a crosslink with a coating layer 140a to be described later. In the multilayer ceramic electronic component according to the present disclosure, a bonding force of the adhesion assisting layer 140b with the surface of the ceramic body 110 and/or the coating layer 140a may be improved by applying the compound including the two or more vinyl groups to the adhesion assisting layer 140b.

The compound containing two vinyl groups is not particularly limited, and may include, for example, 2,4,6,8-tetramethyl-2,4,6,8-tetravinylcyclotetrasiloxane (V4D4), 1,3,5-trimethyl-1,5-trivinyl-cyclotrisiloxane (V3D3), divinylbenzene (DVB), diethyleneglycoldivinylether (DEGDVE), ethyleneglycoldiacrylate (EGDA), ethyleneglycoldimethacrylate (EGDMA), 1,3-diethenyl-1,1,3,3-tetramethyl-disiloxane (V2D2), and the like.

In an exemplary embodiment, the adhesion assisting layer 140b of the multilayer ceramic electronic component according to the present disclosure may have an average thickness of 25 nm or more. The average thickness of the adhesion assisting layer 140b may be a value measured by the method described above. When the adhesion assisting layer 140b is formed of the compound including the two or more vinyl groups, at least one vinyl group may be used for bonding the adhesion assisting layer 140b to the ceramic body 110, and the other vinyl group may be used for bonding the adhesion assisting layer 140b to a coating layer 140a to be described later. In this case, in order for the adhesion assisting layer 140b according to the present exemplary embodiment to have a sufficient adhesive force, the vinyl group of the polymer of the adhesion assisting layer 140b need be sufficiently able to be led onto the surface. The average thickness may be for this purpose, the adhesion assisting layer 140b having the average thickness of at least 25 nm needs to be disposed in order to secure a sufficient bonding force, and when the average thickness of the adhesion assisting layer 140b is less than 25 nm, a strength of the protective layer 140 may be decreased due to insufficiency of the bonding force. An upper limit of the average thickness of the adhesion assisting layer 140b is not particularly limited, and may be smaller than or equal to, for example, $t_h$–25 nm in which $t_h$ is the average thickness of the protective layer 140.

In an exemplary embodiment in the present disclosure, the coating layer 140a of the protective layer 140 of the multilayer ceramic electronic component may include a hydrophobic polymer. The hydrophobic polymer may refer to a polymer formed from a hydrophobic monomer. In the present specification, the term "hydrophobicity" may mean that a surface formed of a certain component has a contact angle of 90° or more with respect to water at room temperature/1 atmosphere. The hydrophobic monomer is not particularly limited as long as it exhibits sufficient water repellent capability, and may include one or more monomers selected from the group consisting of siloxanes, acryls, amines, carbonates, esters, and fluorocarbons.

In an exemplary embodiment, the protective layer 140 of the multilayer ceramic electronic component according to the present disclosure may use a compound including a vinyl group and fluorine. The vinyl group may form a crosslink with the adhesion assisting layer 140b described above to enhance a bonding force of the coating layer 140a, and fluorine may provide excellent water repellency and physical/chemical resistance to external contaminants.

A type of the compound including the vinyl group and fluorine is not particularly limited. The compound including the vinyl group and fluorine may include, for example, 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptylacrylate, 2-methyl-3,3,4,4,5,5,6,6,7,7,7-undecafluoroheptyl acrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroundecyl acrylate, 2-methyl-3,3,4,4,5,5,6,6,7,7,8,8,9,9,10,10,11,11,11-nonadecafluoroun decyl acrylate, 3,3,4,4,5,5,6,6,7,7,8,8,9,9,10,10,11,11,12,12,12-heneicosafluorododecyl acrylate, 2-methyl-3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,11,11,12,12,13,13,13-tricosafluorotridecyl acrylate, 2-methyl-3,3,4,4,5,5,6,6,7,7,8,8,9,9,10,10,11,11,12,12,13,13,13-tricosafluorotridecyl acrylate, 3,3,4,4,5,5,6,6,7,7,8,8,9,9,10,10,11,11,12,12,13,13,14,14,14-pentacosafluorotetradecyl acrylate, 2-methyl-3,3,4,4,5,5,6,6,7,7,8,8,9,9,10,10,11,11,12,12,13,13,14,14,14-pentacosafluorotetradecyl acrylate, and the like, but are not limited thereto.

In another exemplary embodiment in the present disclosure, the coating layer 140a of the multilayer ceramic electronic component may be an inorganic thin film layer. The inorganic thin film layer may be formed of an oxide or a nitride of a metal and/or non-metal compound or compounds thereof. In the present exemplary embodiment, when the coating layer 140a of the protective layer 140 is the inorganic thin film layer, a chemical reaction with external contaminants may be significantly reduced, such that reliability of the protective layer 140 may be improved. A component of the inorganic thin film layer is not particularly limited, and may include, for example, one or more oxides selected from the group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, and $BaTiO_3$ or one or more nitrides selected from the group consisting of AlN and $SiN_x$.

In an exemplary embodiment, the coating layer 140a of the multilayer ceramic electronic component according to the present disclosure may have an average thickness of 25 nm or more. The average thickness of the coating layer 140a may be a value measured by the method described above. As in a case of the adhesion assisting layer 140b, the coating layer 140a also needs to be formed as a film having a thickness of a predetermined level or more on the adhesion assisting layer 140b in order to have a desired water repellent force. The average thickness is for this purpose, the average thickness of the coating layer 140a may be preferably 25 nm or more. An upper limit of the average thickness of the coating layer 140a is not particularly limited, and may be smaller than or equal to, for example, $t_h$–25 nm in which $t_h$ is the average thickness of the protective layer 140.

A method of forming the adhesion assisting layer 140b and the coating layer 140a of the multilayer ceramic electronic component according to the present disclosure is not particularly limited. The adhesion assisting layer 140b and the coating layer 140a may be formed by, for example, an atomic layer deposition (ALD) method, a molecular layer deposition (MLD) method, a chemical vapor deposition (CVD) method, a sputtering method, or the like, but are not limited thereto.

In another exemplary embodiment in the present disclosure, a multilayer ceramic electronic component may include a ceramic body 110 including dielectric layers 111 and first internal electrodes 121 and second internal electrodes 122 disposed to face each other and alternately stacked with the respective dielectric layers 111 interposed therebetween; a first external electrode 131 connected to the first internal electrodes 121; a second external electrode 132 connected to the second internal electrodes 122; and a cover layer 140 disposed on the ceramic body 110, the first external electrode 131, and the second external electrode 132, wherein the cover layer 140 includes a first layer 140b and a second layer 140a, an average thickness of the cover layer 140 is 70 nm or more and/or less than 400 nm, and a ratio ($t_a/t_h$) of an average thickness ($t_a$) of the second layer 140a to the average thickness ($t_h$) of the cover layer 140 may be 0.25 or more and/or 0.75 or less.

In another exemplary embodiment in the present disclosure, a multilayer ceramic electronic component may include a ceramic body 110 including dielectric layers 111 and first internal electrodes 121 and second internal electrodes 122 disposed to face each other and alternately stacked with the respective dielectric layers 111 interposed therebetween; a first external electrode 131 connected to the first internal electrodes 121; a second external electrode 132 connected to the second internal electrodes 122; and a cover layer 140 disposed on the ceramic body 110, the first external electrode 131, and the second external electrode 132, wherein the cover layer 140 includes a first layer 140b and a second layer 140a, an average thickness of the cover layer 140 is 400 nm or more and/or 600 nm or less, and a ratio ($t_a/t_h$) of an average thickness ($t_a$) of the second layer 140a to the average thickness ($t_h$) of the cover layer 140 may be 0.05 or more to 0.95 or less.

The average thickness of the second layer 140a may be 25 nm or more.

The cover layer 140 may include a crosslink linking the first layer and the second layer 140a to each other.

The cover layer 140 may be disposed to cover at least parts of the ceramic body 110, the first external electrode 131, and/or the second external electrode 132.

The first layer 140b may include one or more selected from the group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, a siloxane-based polymer, an melamine-based polymer, and an alkyd-based polymer.

The polymer of the second layer 140a may include a compound containing two or more vinyl groups.

The second layer 140a may include a hydrophobic polymer.

The second layer 140a may include compound including a vinyl group and fluorine.

The second layer 140a may be an inorganic thin film layer.

The second layer 140a may include one or more selected from the group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$, AlN, and $SiN_x$.

In the present exemplary embodiment, a description of contents overlapping those of the embodiment described above will be omitted.

Experimental Example

Ion migration suppression, a bonding strength, a mounting defect, and a moisture resistance load defect of the multilayer ceramic electronic component according to the present disclosure were tested under the following conditions.

Components used in the test were multilayer ceramic capacitors (MLCCs) in which first and second electrode layers were formed on a ceramic body using copper (Cu), and Ni and Sn plating layers were then sequentially formed. Hundred products for mass production having a size of 1.6 mm×0.8 mm×0.8 mm and available from Samsung Electro-Mechanics were used as the MLCCs.

A protective layer 140 was formed on the multilayer ceramic electronic component using an initiated chemical vapor deposition (iCVD) equipment. Tetra-butyl peroxide (TBPO) was used as an deposition initiator, and 2,4,6,8-tetramethyl-2,4,6,8-tetravinylcyclotetrasiloxane (V4D4) and perfluorodecyl methacrylate (PFDMA) were used as materials of an adhesion assisting layer and a coating layer, respectively.

As a deposition condition, the multilayer ceramic electronic component was disposed on a board maintained at 40° C., and a filament temperature was set at 200° C. Thereafter, a deposition time was adjusted to manufacture multilayer ceramic electronic components of which thicknesses of protective layers are different from each other as follows.

Figure 6A:
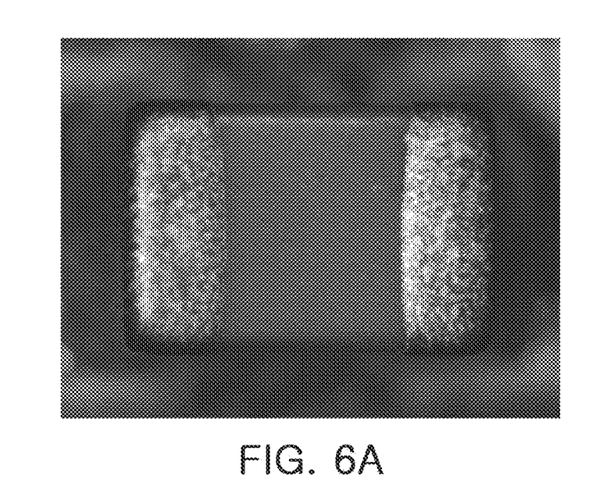
FIG. 6A is a captured image of a multilayer ceramic electronic component in which ion migration has not occurred.
Figure 6B:
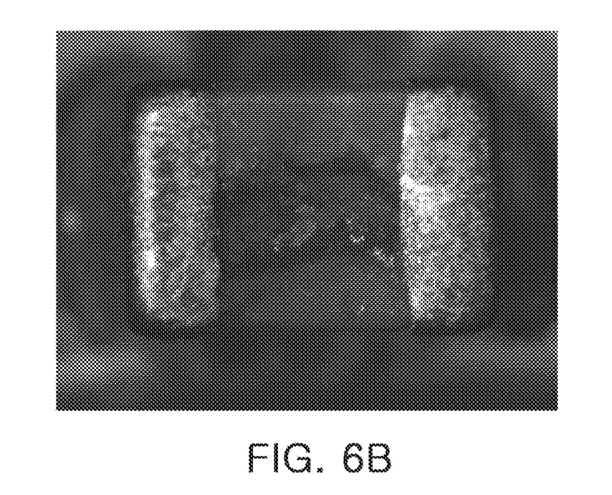
FIG. 6B is a captured image of a multilayer ceramic electronic component in which ion migration has occurred.

An ion migration test was conducted by dropping 1.3 ml of distilled water between both external electrodes under a condition of 25° C. and 1 atmosphere and then applying direct current (DC) power of 15V to the external electrodes. As ion migration proceeds after the power is applied to the external electrodes, it was observed that dendrites of a metal component grow from a negative electrode of the MLCC to a positive electrode of the MLCC. At the moment when both electrodes of the multilayer ceramic electronic component are connected to each other with the grown dendrites, a current of 1 mA or more flows, and the number of multilayer ceramic electronic components in which the current flows within five minutes was measured. FIG. 6A is a captured image of a multilayer ceramic electronic component in which ion migration has not occurred, and FIG. 6B is a captured image of a multilayer ceramic electronic component in which ion migration has occurred.

A bonding strength test was conducted using an adhesive tape of which a delamination force measured at a speed of 300 mm/min and an angle of 90° at 25° C. with respect to a glass substrate is 30 gf/25 mm The adhesive tapes were attached to surfaces of the multilayer ceramic electronic components, and after 1 minute has elapsed, a force was applied at an angle of 90° to the adhesive tapes to detach the adhesive tapes from the multilayer ceramic electronic components. The number of components in which protective layers were removed on the surfaces to which the adhesive tapes were attached after the adhesive tapes were detached was measured.

Figure 7A:
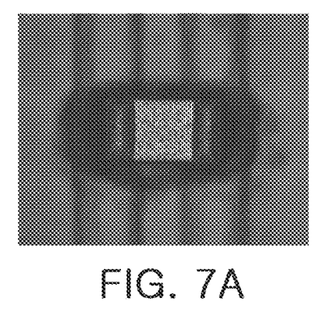
FIG. 7A is a captured image of a multilayer ceramic electronic component that is normally mounted on a board.
Figure 7B:
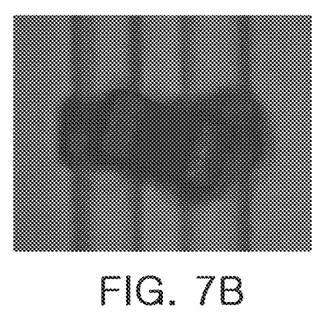
FIG. 7B is a captured image of a multilayer ceramic electronic component of which misalignment has occurred at the time of mounting the multilayer ceramic electronic component on a board.
Figure 7C:
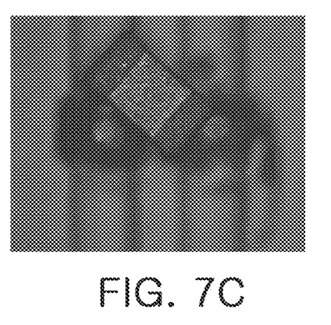
FIG. 7C is a captured image of a multilayer ceramic electronic component of which separation from a board has occurred at the time of mounting the multilayer ceramic electronic component on the board.

In a mounting failure test, multilayer ceramic electronic components were mounted on boards to which electrode pads are attached, using solders, and the number of multilayer ceramic electronic components that are misaligned was measured. FIG. 7A is a captured image of a multilayer ceramic electronic component that is not misaligned, FIG. 7B is a captured image of a multilayer ceramic electronic component of which misalignment has occurred, and FIG. 7C is a captured image of a multilayer ceramic electronic component in a case in which the multilayer ceramic electronic component is separated.

In a moisture resistance load test, the number of multilayer ceramic electronic components in which defects have occurred when a rated voltage was applied to the multilayer ceramic electronic components at a temperature of 85° C. and a relative humidity of 85% was measured.

TABLE 1

| Thickness (nm) of Protective Layer | Thickness (nm) of Adhesion Assisting Layer | Thickness (nm) of Coating Layer | Migration Defect | Bonding Strength (Tape Test) | Mounting Defect | Moisture Resistance Load Test Defect |
|---|---|---|---|---|---|---|
| 100 | 20 | 80 | 1/100 | 12/100 | 0/100 | 2/100 |
|  | 30 | 70 | 0/100 | 0/100 | 0/100 | 0/100 |
|  | 50 | 50 | 0/100 | 0/100 | 0/100 | 0/100 |
|  | 70 | 30 | 0/100 | 0/100 | 0/100 | 0/100 |
|  | 80 | 20 | 12/100 | 0/100 | 0/100 | 17/100 |

TABLE 1-continued

| Thickness (nm) of Protective Layer | Thickness (nm) of Adhesion Assisting Layer | Thickness (nm) of Coating Layer | Migration Defect | Bonding Strength (Tape Test) | Mounting Defect | Moisture Resistance Load Test Defect |
|---|---|---|---|---|---|---|
| 200 | 20 | 180 | 0/100 | 5/100 | 0/100 | 0/100 |
|  | 50 | 150 | 0/100 | 0/100 | 0/100 | 0/100 |
|  | 100 | 100 | 0/100 | 0/100 | 0/100 | 0/100 |
|  | 150 | 50 | 0/100 | 0/100 | 0/100 | 0/100 |
|  | 180 | 20 | 6/100 | 0/100 | 0/100 | 11/100 |
| 600 | 20 | 580 | 0/100 | 6/100 | 0/100 | 0/100 |
|  | 50 | 550 | 0/100 | 0/100 | 0/100 | 0/100 |
|  | 200 | 400 | 0/100 | 0/100 | 0/100 | 0/100 |
|  | 400 | 200 | 0/100 | 0/100 | 0/100 | 0/100 |
|  | 550 | 50 | 0/100 | 0/100 | 0/100 | 0/100 |
|  | 580 | 20 | 7/100 | 0/100 | 0/100 | 8/100 |
| 700 | 20 | 680 | 0/100 | 3/100 | 4/100 | 0/100 |
|  | 50 | 650 | 0/100 | 0/100 | 7/100 | 0/100 |
|  | 200 | 500 | 0/100 | 0/100 | 3/100 | 0/100 |
|  | 500 | 200 | 0/100 | 0/100 | 11/100 | 0/100 |
|  | 650 | 50 | 0/100 | 0/100 | 5/100 | 0/100 |
|  | 680 | 20 | 5/100 | 0/100 | 3/100 | 5/100 |

Referring to Table 1, it may be confirmed that when a thickness of the protective layer is 100 nm, in a case in which a thickness of the adhesive assisting layer is 20 nm and a thickness of the coating layer is 80 nm, ion migration occurs and defects occur in the bonding strength test and the moisture resistance load test, but in a case in which a thickness of the adhesive assisting layer is 30 nm and a thickness of the coating layer is 70 nm, excellent results appear in all the tests. In addition, it may be confirmed that when a thickness of the protective layer is 100 nm, in a case in which a thickness of the adhesive assisting layer is 80 nm and a thickness of the coating layer is 20 nm, defects occur in the migration test and the moisture resistance load test in a plurality of products, but in a case in which a thickness of the adhesive assisting layer is 70 nm and a thickness of the coating layer is 30 nm, defects do not occur in all the tests.

It may be confirmed that when a thickness of the protective layer is 200 nm, in a case in which a thickness of the adhesive assisting layer is 20 nm and a thickness of the coating layer is 180 nm, a bonding strength is excessively decreased, but in a case in which a thickness of the adhesive assisting layer is 50 nm and a thickness of the coating layer is 150 nm, excellent results appear in all the tests. In addition, it may be confirmed that in a case in which a thickness of the adhesive assisting layer is 180 nm and a thickness of the coating layer is 20 nm, ion migration occurs and a very poor result appears in the moisture resistance load test, but in a case in which a thickness of the adhesive assisting layer is 150 nm and a thickness of the coating layer is 50 nm, defects do not occur at all in all the tests.

In addition, it may be confirmed that when a thickness of the protective layer is 600 nm, in a case in which a thickness of the adhesive assisting layer is 20 nm and a thickness of the coating layer is 580 nm, a bonding strength is significantly decreased, but in a case in which a thickness of the adhesive assisting layer is 50 nm and a thickness of the coating layer is 550 nm, defects do not occur in all the tests. In addition, it may be confirmed that in a case in which a thickness of the adhesive assisting layer is 580 nm and a thickness of the coating layer is 20 nm, ion migration occurs and defects occur in the moisture resistance load test in a plurality of products, but in a case in which a thickness of the adhesive assisting layer is 550 nm and a thickness of the coating layer is 50 nm, excellent results appear in all the tests.

On the other hand, it may be seen that in a case in which a total thickness of the protective layer is 700 nm, defects are found a results of each test in a plurality of products regardless of a ratio of between the adhesion assisting layer and the coating layer.

Therefore, when the test results are summarized, it may be confirmed that in a case in which an average thickness of the entire protective layer of the multilayer ceramic electronic component is 70 nm or more and/or less than 400 nm, when a ratio ($t_a/t_h$) of an average thickness ($t_a$) of the coating layer to the average thickness ($t_h$) of the protective layer is 0.25 or more and/or 0.75 or less, excellent results uniformly appear in the ion migration test, the bonding strength test, the mounting defect test, and the moisture resistance load test.

In addition, it may be confirmed that in a case in which an average thickness of the protective layer is 400 nm or more and/or 600 nm or less, when a ratio ($t_a/t_h$) of an average thickness ($t_a$) of the coating layer to the average thickness ($t_h$) of the protective layer is 0.05 or more to 0.95 or less, excellent results appear in all the tests.

In addition, it may be confirmed that even though the ratio ($t_a/t_h$) of the average thickness ($t_a$) of the coating layer to the average thickness ($t_h$) of the protective layer is in the ranges described above, in a case in which the thickness of the adhesion assisting layer and/or the thickness of the coating layer are less than 25 nm, characteristics of respective adhesion assisting layer and the coating layer are not sufficiently exhibited. Therefore, it may be confirmed that the average thickness of the protective layer, the ratio of the average thickness of the coating layer to the average thickness of the protective layer, and/or the average thickness of the adhesion assisting layer and the coating layers are in predetermined ranges, an excellent multilayer ceramic electronic component in which the ion migration is effectively suppressed, the bonding strength of the protective layer is excellent, and the mounting defect and the moisture resistance load defect do not occur may be provided.

As set forth above, according to an exemplary embodiment in the present disclosure, deterioration of characteristics of the multilayer ceramic electronic component due to penetration of moisture into the multilayer ceramic electronic component may be prevented.

In addition, the ion migration in the multilayer ceramic electronic component may be suppressed.

Further, a defect such as a short circuit in the multilayer ceramic electronic component may be reduced.

Further, the multilayer ceramic electronic component having excellent reliability may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first internal electrodes and second internal electrodes disposed to face each other and alternately stacked with the respective dielectric layers interposed therebetween;
a first external electrode connected to the first internal electrodes;
a second external electrode connected to the second internal electrodes; and
a protective layer disposed on the ceramic body, the first external electrode, and the second external electrode,
wherein the protective layer includes an adhesion assisting layer and a coating layer,
an average thickness of the protective layer is 70 nm or more and less than 400 nm, and
a ratio of an average thickness of the coating layer to the average thickness of the protective layer is 0.25 or more and 0.75 or less.

2. The multilayer ceramic electronic component of claim 1, wherein the coating layer has an average thickness of 25 nm or more.

3. The multilayer ceramic electronic component of claim 1, wherein the protective layer includes a crosslink linking the adhesion assisting layer and the coating layer to each other.

4. The multilayer ceramic electronic component of claim 1, wherein the protective layer is disposed to cover at least parts of the ceramic body, the first external electrode, and the second external electrode.

5. The multilayer ceramic electronic component of claim 1, wherein the adhesion assisting layer includes one or more selected from a group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer.

6. The multilayer ceramic electronic component of claim 5, wherein the one or more selected polymer of the adhesion assisting layer includes a compound including two or more vinyl groups.

7. The multilayer ceramic electronic component of claim 1, wherein the coating layer includes a hydrophobic polymer.

8. The multilayer ceramic electronic component of claim 7, wherein the coating layer includes a compound including a vinyl group and fluorine.

9. The multilayer ceramic electronic component of claim 1, wherein the coating layer is an inorganic thin film layer.

10. The multilayer ceramic electronic component of claim 9, wherein the coating layer includes one or more selected from a group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$, AlN, and SiNx.

11. The multilayer ceramic electronic component of claim 1, wherein the coating layer is disposed to cover the adhesion assisting layer.

12. A multilayer ceramic electronic component comprising:
a ceramic body including dielectric layers and first internal electrodes and second internal electrodes disposed to face each other and alternately stacked with the respective dielectric layers interposed therebetween;
a first external electrode connected to the first internal electrodes;
a second external electrode connected to the second internal electrodes; and
a cover layer disposed on the ceramic body, the first external electrode, and the second external electrode,
wherein the cover layer includes a first layer and a second layer,
an average thickness of the cover layer is 70 nm or more and less than 400 nm, and
a ratio of an average thickness of the second layer to the average thickness of the cover layer is 0.25 or more and 0.75 or less.

13. The multilayer ceramic electronic component of claim 12, wherein the second layer has an average thickness of 25 nm or more.

14. The multilayer ceramic electronic component of claim 12, wherein the cover layer includes a crosslink linking the first layer and the second layer to each other.

15. The multilayer ceramic electronic component of claim 12, wherein the cover layer is disposed to cover at least parts of the ceramic body, the first external electrode, and the second external electrode.

16. The multilayer ceramic electronic component of claim 12, wherein the first layer includes one or more selected from a group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer.

17. The multilayer ceramic electronic component of claim 16, wherein the one or more selected polymer of the second layer includes a compound including two or more vinyl groups.

18. The multilayer ceramic electronic component of claim 12, wherein the second layer includes a hydrophobic polymer.

19. The multilayer ceramic electronic component of claim 18, wherein the second layer includes a compound including a vinyl group and fluorine.

20. The multilayer ceramic electronic component of claim 12, wherein the second layer is an inorganic thin film layer.

21. The multilayer ceramic electronic component of claim 20, wherein the second layer includes one or more selected from a group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$, AlN, and SiNx.

22. The multilayer ceramic electronic component of claim 12, wherein the first external electrode includes a first electrode layer connected to the first internal electrodes, a first conductive layer disposed on the first electrode layer, and a first metal layer disposed on the first conductive layer, and
the second external electrode includes a second electrode layer connected to the second internal electrodes, a second conductive layer disposed on the second electrode layer, and a second metal layer disposed on the second conductive layer.

23. The multilayer ceramic electronic component of claim 22, wherein the first electrode layer and the second electrode layer are sintered electrodes including a conductive metal.

24. The multilayer ceramic electronic component of claim 22, wherein the first conductive layer and the second conductive layer are plating layers.

25. The multilayer ceramic electronic component of claim 22, wherein the first metal layer and the second metal layer are plating layers.

26. The multilayer ceramic electronic component of claim 12, wherein the second layer is disposed to cover the first layer.

27. The multilayer ceramic electronic component of claim 12, wherein the second layer covering the first external electrode and the second layer covering the second external electrode are connected to each other.

28. The multilayer ceramic electronic component of claim 12, wherein the first layer covering the first external electrode and the first layer covering the second external electrode are spaced apart from each other.

* * * * *